United States Patent [19]

Mizumukai et al.

[11] Patent Number: 4,491,339

[45] Date of Patent: Jan. 1, 1985

[54] STRUT FOR MCPHERSON TYPE AUTOMOBILE SUSPENSIONS

[75] Inventors: Ken Mizumukai, Iwakura; Shinichi Higuchi, Gifu, both of Japan

[73] Assignee: Kayaba KKK, Tokyo, Japan

[21] Appl. No.: 335,740

[22] Filed: Dec. 30, 1981

[51] Int. Cl.³ ............................................. B60G 3/06
[52] U.S. Cl. .................................................. 280/668
[58] Field of Search .............. 280/668, 663, 667, 666; 188/322.19, 322.11, 321.11

[56] References Cited

U.S. PATENT DOCUMENTS 3,917,308  11/1975  Schulz ................................. 280/668
4,321,988  3/1982   Bich ................................... 280/668

FOREIGN PATENT DOCUMENTS 2653006  5/1977  Fed. Rep. of Germany ........................ 188/321.11
2514456  1/1978  Fed. Rep. of Germany ...... 280/668

OTHER PUBLICATIONS

"McPherson Strut Suspensions", *Motor Age,* Sep. 1976, pp. 61-64.

*Primary Examiner*—Joseph F. Peters, Jr.
*Assistant Examiner*—Ross Weaver
*Attorney, Agent, or Firm*—Saul Jecies

[57] ABSTRACT

A strut for McPherson type automobile suspensions wherein, in order to minimize the maximum bending stress occurring in the tubular member forming the cylinder of the liner type shock absorber, the knuckle bracket fitted to the lower end of the tubular member is formed by the first bracket with a U-shaped cross-section and the second bracket with a ⌣-shaped cross-section fitted in the opening part of the said first bracket and a ribbed part is formed beforehand by extending upward the upper end part of the said second bracket so that, by contacting the said ribbed part to the outer walls of the said tubular member, those parts which receive the maximum bending stress may be reinforced.

4 Claims, 7 Drawing Figures

STRUT FOR MCPHERSON TYPE AUTOMOBILE SUSPENSIONS

BACKGROUND OF THE INVENTION

The present invention relates to a tubular member forming the cylinder of liner type shock absorbers and a knuckle bracket constructed from sheet metal and relates to a strut for McPherson type automobile suspensions, wherein the said knuckle bracket parts for fitting the bearing bush, i.e., the bearing spindle of the wheel brake and the said tubular member are fitted at the lower end in the through hole of the said knuckle bracket and fixed forced-push fitting, welding or other means.

Constructions of such a type are well-known, for instance, from U.S. Pat. No. 3,941,401. The knuckle bracket of the strut described in this specification is formed from sheet metal and therefore it is better in that it offers low in manufacturing costs and light weight compared with the common knuckle brackets which are formed from forged steel or cast iron. In addition, it is general knowledge that a cylindrical axle bracket is already being used in practice which has a bracket part for fitting the knuckle spindle at one side of a strut formed by the first bracket with a U-shaped cross-section covering three fourths of the outer circumference of a tubular member in a strut and the second brackt with a ⊢⊣-shaped cross-section fitted in the opening part of the first bracket.

However, where these well-known struts for McPherson type suspensions are used in practice, the maximum bending stress is applied to that part of the tubular member which is fitted in the upper end of the knuckle bracket. Since the bending force occurring between the tubular member and the knuckle bracket causes the corresponding part of the tubular member to deform elastically with repeated vibration occuring, cracks or fractures may develop in the tubular member due to bending fatigue and there is a danger of automobile suspensions breaking, thus causing serious danger.

These defects may be lessened by increasing the thickness of the particular part of the conventional above-mentioned tubular members or by welding a reinforcing sleeve fitted to the particular part of the tubular members as disclosed in the Specification of U.S. Pat. No. 3,430,977; however, such means will nullify the low cost and weight advantages to be obtained with the use of a knuckle bracket formed from sheet metal.

SUMMARY OF THE INVENTION

Therefore, the purpose of the present invention is to use a knuckle bracket made of sheet metal which has low manufacturing costs and a light weight and acts as a strut for McPherson type suspensions which, with use of quite simple means, may reduce the maximum bending stress occurring in the tubular member at the part fitted in the upper end of the knuckle bracket.

Thus, with the bending load being applied to the tubular member in the same direction relative to the knuckle bracket, the result is not only a knuckle bracket consisting of the first bracket with a U-shaped and a second bracket with a ⊢⊣-shaped cross-section in the opening part of the first bracket, but also a back wall on the upper end of the second bracket extending upward from this part and a pair of walls facing each other and extending forward at right angles from both side edges of the said back wall. Thus, where the knuckle bracket is fitted to the tubular member, the ribbed part of the second bracket of the said knuckle bracket is placed along the outer circumference of the tubular member so that the part extending as a rib of the knuckle bracket may serve to reinforce that part of the tubular member which receives the maximum bending stress in the strut.

In this way, the maximum, bending stress applied to the tubular member is reduced to a low level, so that destruction of the tubular member may be prevented and its service life may lengthened considerably. Furthermore, even though the knuckle bracket may be formed by extending a rib, its original function is not at all affected nor does this arrangement lead to major increases in cost.

Also, where front edges of the face-to-face walls which form the said rib part are formed as tapered parts inclined backward, the bending stress occurring in the tubular member may be rendered uniform by this ribbed part.

Furthermore, when holes are formed in these face-to-face walls in the ribbed part to allow a brake hose to pass through, it is possible to avoid difficulties associated with the fitting of any separate brackets for supporting the brake hose.

The following describes the potential applications of the present invention with reference to the drawings attached.

DESCRIPTION OF THE PREFERRED EMBODIMENTS

Figure 1:
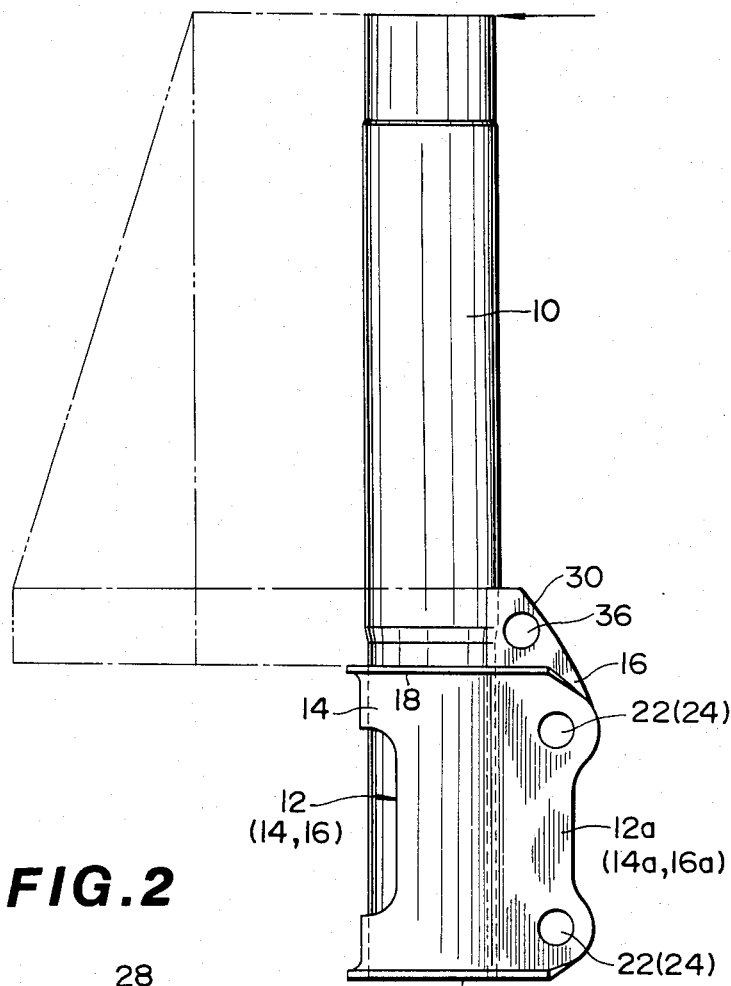
FIG. 1 represents a side view of a strut according to the present invention.
Figure 2:
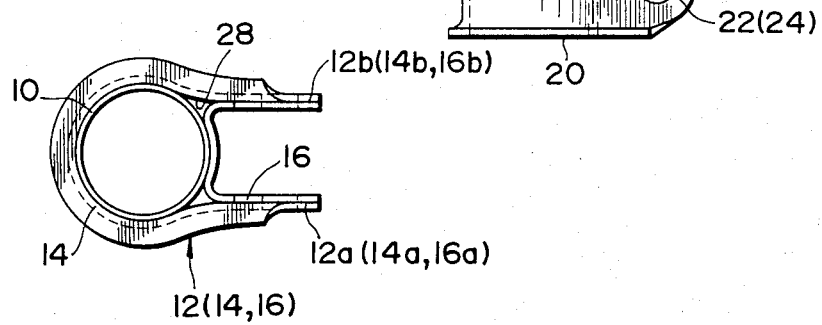
FIG. 2 represents a plan view of the same.
Figure 3:
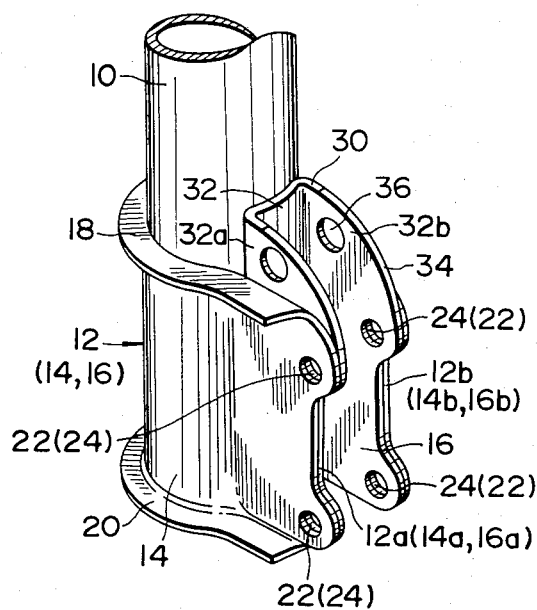
FIG. 3 represents a diagonal view of its essential structure part.

FIGS. 1, 2 and 3 show a tubular member (10), which forms the cylinder of a liner type shock absorber and is located in a strut for McPherson type automobile suspensions.

It is already common knowledge that this tubular member (10) is provided with a knuckle bracket (12), at the lower end, which has a pair of flange parts (12a) (12b) for fitting a bearing bush, i.e., bearing spindle of an automobile wheel brake.

The said knuckle bracket (12) consists of the first bracket (14) and the second bracket (16), both of which are formd from sheet metal for the purpose of reducing product weight and costs.

Figure 4:
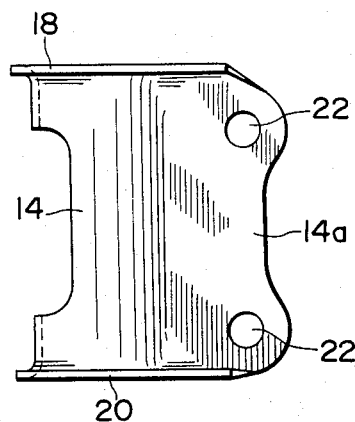
FIG. 4 represents a side view of the first bracket forming a knuckle bracket.
Figure 5:
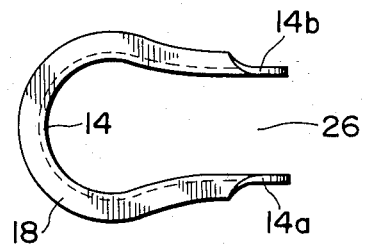
FIG. 5 represents a plan view of the same.

As can be seen from FIGS. 4 and 5, the first bracket (14) is formed by bending sheet metal so as to produce a U-shaped cross-section and is provided at both the upper and lower ends with reinforcing edges (18) (20) extending horizontally and with a pair of bracket parts (14a) (14b) extending forward, in which bracket parts (14a) (14b) fitting holes (22) are formed for fitting the said bearing spindle.

Figure 6:
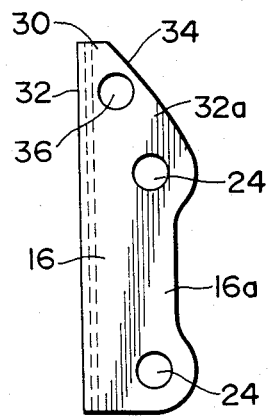
FIG. 6 represents a side view of the second bracket forming the same knuckle bracket.
Figure 7:
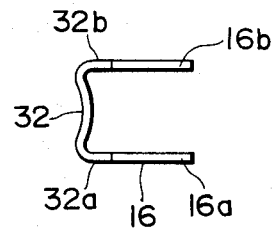
FIG. 7 represents a plan view of the same.

Moreover, as indicated in FIGS. 6 and 7, the second bracket (16) is formed by bending sheet metal so as to produce a ⊔-shaped cross-section, and fitting holes (24) are bored in the pair of bracket parts (16a) (16b) extending forward, and mating with the fitting holes (22) of the said first bracket (14).

As can be seen from FIG. 2, the above second bracket (16) is inserted into the first bracket (14) through the opening part (26) (Refer to FIG. 5) and fitted so as to ensure the respective pairs of bracket parts (14a) and (16a), (14b) and (16b) mate with the fitting holes (22) and (24). If necessary, they are combined to form an integral body by welding or other means. The knuckle bracket (12) thus constructed by the first bracket (14) and the second bracket (16) has a nearly tubular through hole (28) at the center, into which hole (28) the said tubular member (10) is inserted at the lower end and force-push fitted, welded or joined by other means.

In the above-mentioned case, as can particularly be seen from FIG. 3 the second bracket (16) forming the knuckle bracket (12) extends beyond the upper end of the first bracket (14) and forms a ribbed part (30), which part (30) is an essential element of the present invention.

The said ribbed part (30) consists of a back wall (32) extending upward from the body of the second bracket (16) and extensions of the pair of bracket parts (16a) (16b), i.e., a pair of face-to-face walls (32a) (32b) extending forward at right angles from the front side edges of the said back wall (32), and the back wall (32) of this ribbed part (30) contacts and supports the outer surfaces of the said tubular member (10) to reinforce that part in the tubular member (10) which receives the maximum bending stress.

Particularly, when the front edges of the pair of face-to-face walls (32a) (32b) in the ribbed part (30) are formed as tapered parts (34) inclined backward, as shown in this practical example, the bending stress of the part reinforced by the ribbed part (30) in the tubular member (10) may be rendered uniform as indicated by the bending stress diagram marked by the double-dot-dash line in FIG. 1.

Also, when these face-to-face walls (32a) (32b) are provided with holes (36) to allow a brake hose to pass through, it is possible to suppress the fitting of any separate bracket.

What we claim is:

1. An arrangement for reducing the maximum bending stress in the tubular member in the portion of maximum bending of a strut for McPherson-type automobile suspensions wherein said tubular member has an outer wall forming the cylinder of a liner type shock absorber; and a knuckle bracket fitted to the lower end of said tubular member;
wherein said knuckle bracket comprises:
a first sheet metal bracket of U-shaped cross section of a predetermined length;
having an opening part and an inner face;
a second sheet metal bracket inserted in said opening of said first bracket;
said second bracket having an outer face, an arcuate base and two sides extending from said base, the outer face of said base facing the inner face of said first bracket, and forming upon insertion of said second bracket into said first bracket a substantially cylindrical hole;
said second bracket having a length extending beyond the length of the said first bracket constituting a rib;
said rib contacting and supporting said tubular member at said portion of maximum bending stress so that said extended portion of said second bracket faces said outer wall of said tubular member to serve as a reinforcement of said portion of said tubular member subject to maximum bending, thus reducing the bending of said portion and reducing the maximum bending stress of said tubular member.

2. A knuckle bracket as claimed in claim 1 wherein the second bracket is made of unreinforced sheet metal.

3. A knuckle bracket according to claim 1 wherein said first bracket is secured to said second bracket.

4. A knuckle bracket according to claim 1 wherein said first metal bracket and said second metal bracket contain apertures in register to each other and allow a braking hose to pass through said front edges.

* * * * *